United States Patent
Larin et al.

(10) Patent No.: US 10,120,692 B2
(45) Date of Patent: Nov. 6, 2018

(54) METHODS AND APPARATUS FOR STORAGE AND TRANSLATION OF AN ENTROPY ENCODED INSTRUCTION SEQUENCE TO EXECUTABLE FORM

(75) Inventors: Sergei Larin, Austin, TX (US); Lucian Codrescu, Austin, TX (US); Anshuman Das Gupta, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 13/192,916

(22) Filed: Jul. 28, 2011

(65) Prior Publication Data

US 2013/0031337 A1   Jan. 31, 2013

(51) Int. Cl.
G06F 9/30 (2006.01)
G06F 9/38 (2018.01)

(52) U.S. Cl.
CPC ........ G06F 9/30178 (2013.01); G06F 9/3017 (2013.01); G06F 9/30156 (2013.01); G06F 9/3853 (2013.01)

(58) Field of Classification Search
CPC .................. G06F 9/30156; G06F 9/30178
USPC .................................................. 712/24, 226
See application file for complete search history.

(56) References Cited

U.S. PATENT DOCUMENTS

| 5,463,750 A | 10/1995 | Sachs |
| 5,924,125 A | 7/1999 | Arya |
| 6,199,126 B1 * | 3/2001 | Auerbach et al. ............ 710/68 |
| 6,339,816 B1 | 1/2002 | Bausch |
| 6,779,101 B1 * | 8/2004 | Berg et al. .................... 712/24 |

(Continued)

FOREIGN PATENT DOCUMENTS

| CN | 1531235 A | 9/2004 |
| CN | 101010666 A | 8/2007 |

(Continued)

OTHER PUBLICATIONS

Simonen, "Variable-Length Instruction Compression for Area Minimization," Institute of Digital and Computer Systems, Tampere University of Technology, ISBN0-7695-1992-X/03.

(Continued)

*Primary Examiner* — Keith Vicary
(74) *Attorney, Agent, or Firm* — W&T/Qualcomm

(57) ABSTRACT

A method of compressing a sequence of program instructions begins by examining a program instruction stream to identify a sequence of two or more instructions that meet a parameter. The identified sequence of two or more instructions is replaced by a selected type of layout instruction which is then compressed. A method of decompressing accesses an X-index and a Y-index together as a compressed value. The compressed value is decompressed to a selected type of layout instruction which is decoded and replaced with a sequence of two or more instructions. An apparatus for decompressing includes a storage subsystem configured for storing compressed instructions, wherein a compressed instruction comprises an X-index and a Y-index. A decompressor is configured for translating an X-index and Y-index accessed from the storage subsystem to a selected type of layout instruction which is decoded and replaced with a sequence of two or more instructions.

26 Claims, 11 Drawing Sheets

(56) References Cited

U.S. PATENT DOCUMENTS

| | | |
|---|---|---|
| 6,801,996 B2 | 10/2004 | Banno et al. |
| 7,249,248 B2 | 7/2007 | Vinnnakota et al. |
| 7,406,585 B2 | 7/2008 | Rose et al. |
| 2003/0217237 A1 | 11/2003 | Benveniste et al. |
| 2004/0015931 A1 | 1/2004 | Larin et al. |
| 2004/0019762 A1* | 1/2004 | Fukuoka et al. ............ 711/203 |
| 2005/0050300 A1 | 3/2005 | May et al. |
| 2005/0102489 A1* | 5/2005 | Kim et al. .................... 712/24 |
| 2006/0150170 A1* | 7/2006 | Larin et al. .................. 717/158 |
| 2006/0168424 A1* | 7/2006 | Leijten et al. ................ 712/24 |
| 2006/0265572 A1 | 11/2006 | Stempel et al. |
| 2007/0022279 A1 | 1/2007 | Wu et al. |
| 2007/0162724 A1* | 7/2007 | Dytrych .................. 712/209 |
| 2007/0174588 A1 | 7/2007 | Fuin |
| 2008/0235492 A1* | 9/2008 | Baek et al. .................... 712/24 |
| 2010/0083001 A1 | 4/2010 | Shah et al. |
| 2010/0223237 A1 | 9/2010 | Mishra et al. |
| 2011/0083001 A1 | 4/2011 | Larin et al. |
| 2012/0284461 A1 | 11/2012 | Larin et al. |
| 2016/0077835 A1 | 3/2016 | Larin |

FOREIGN PATENT DOCUMENTS

| | | |
|---|---|---|
| CN | 101075903 A | 11/2007 |
| CN | 101114217 A | 1/2008 |
| CN | 100492279 C | 5/2009 |
| JP | H0440525 A | 2/1992 |
| JP | H07168694 A | 7/1995 |
| JP | H08161169 A | 6/1996 |
| JP | H0916471 A | 1/1997 |
| JP | H1153186 A | 2/1999 |
| JP | H1185512 A | 3/1999 |
| JP | 2002007211 A | 1/2002 |
| JP | 2002506264 A | 2/2002 |
| JP | 2003167732 A | 6/2003 |
| JP | 2004519028 A | 6/2004 |
| JP | 2005535974 A | 11/2005 |
| JP | 2006500673 A | 1/2006 |
| JP | 2007514245 A | 5/2007 |
| JP | 2008535528 A | 9/2008 |
| JP | 2014513366 A | 5/2014 |
| WO | 2005059738 A2 | 6/2005 |
| WO | 2009061814 A2 | 5/2009 |

OTHER PUBLICATIONS

Larin et al., "Methods and Apparatus for Storage and Translation of Entropy Encoded Software Embedded within a Memory Hierarchy", U.S. Appl. No. 13/099,463, filed May 3, 2011, 89 of pages.

International Search Report and Written Opinion—PCT/US2012/036199—ISA/EPO—Sep. 19, 2012.

International Search Report and Written Opinion—PCT/US2012/048904—ISA/EPO—Sep. 7, 2012.

Seok-Won Seong et al., "Bitmask-Based Code Compression for Embedded Systems", IEEE Transactions on Computer Aided Design of Integrated Circuits and Systems, IEEE Service Center, Piscataway, NJ, US, v o l. 27, No. 4, Apr. 1, 2008 (Apr. 1, 2008), pp. 673-685, XP011206308.

Simonen, et al., "Variable-Length Instruction Compression for Area Minimization," Institute of Digital and Computer Systems, Tampere Univ. of Technol., Finland, Application-Specific Systems, Architectures, and Processors, 2003, IEEE International Conference on, Jun. 24-26, 2003, pp. 155-160.

Wolf W, "Computers as Components," Principles of Embedded Computer System Design, Japan, Nikkei Business Publications, Inc., Mar. 16, 2009, first edition, p. 330.

* cited by examiner

METHODS AND APPARATUS FOR STORAGE AND TRANSLATION OF AN ENTROPY ENCODED INSTRUCTION SEQUENCE TO EXECUTABLE FORM

CROSS REFERENCE TO RELATED APPLICATIONS

U.S. patent application Ser. No. 13/099,463 filed May 3, 2011 entitled "Methods and Apparatus for Storage and Translation of Entropy Encoded Software Embedded within a Memory Hierarchy", has the same assignee as the present application, is a related application, and is hereby incorporated by reference in its entirety.

FIELD OF THE INVENTION SURROGATE

The present invention relates generally to processors having compressed instruction sets for improving code density in embedded applications, and more specifically to techniques for generating a compressed representation of an instruction sequence, storing the compressed instruction sequence, and translating the compressed instruction sequence to executable machine coded program instructions.

BACKGROUND OF THE INVENTION

Many portable products, such as cell phones, laptop computers, personal digital assistants (PDAs) or the like, require the use of a processor executing a program supporting communication and multimedia applications. The processing system for such products includes one or more processors, each with storage for instructions, input operands, and results of execution. For example, the instructions, input operands, and results of execution for a processor may be stored in a hierarchical memory subsystem consisting of a general purpose register file, multi-level instruction caches, data caches, and a system memory.

In order to provide high code density, a native instruction set architecture (ISA) may be used having two instruction formats, such as a 16-bit instruction format that is a subset of a 32-bit instruction format. In many cases, a fetched 16-bit instruction is transformed by a processor into a 32-bit instruction prior to or in a decoding process which allows the execution hardware to be designed to only support the 32-bit instruction format. The use of 16-bit instructions that are a subset of 32-bit instructions is a restriction that limits the amount of information that can be encoded into a 16-bit format. For example, a 16-bit instruction format may limit the number of addressable source operand registers and destination registers that may be specified. A 16-bit instruction format, for example, may use 3-bit or 4-bit register file address fields, while a 32-bit instruction may use 5-bit fields. Processor pipeline complexity may also increase if the two formats are intermixed in a program due in part to instruction addressing restrictions, such as, branching to 16-bit and 32-bit instructions. Also, requirements for code compression vary from program to program making a fixed 16-bit instruction format chosen for one program less advantageous for use by a different program. In this regard, legacy code for existing processors may not be able to effectively utilize the two instruction formats to significantly improve code density and meet real time requirements. These and other restrictions limit the effectiveness of reduced size instructions having fields that are subsets of fields used in the standard size instructions.

SUMMARY OF THE DISCLOSURE

Among its several aspects, embodiments of the invention address a need to improve code density by compressing sequences of program instructions, storing the compressed sequences and translating the compressed sequences to executable sequences of instructions. The techniques addressed herein allow highly efficient utilization of storage and a transmission conduit for embedded software.

To such ends, an embodiment of the invention applies a method of compressing a sequence of program instructions. A sequence of two or more instructions that meet a parameter is identified. The identified sequence of two or more instructions is replaced by a selected type of layout instruction. The selected type of layout instruction is compressed to an X-index and a Y-index pair of compressed values.

Another embodiment of the invention addresses a method of decompressing a compressed value representing a sequence of instructions. An X-index and a Y-index are accessed together as a compressed value. The compressed value is decompressed to a selected type of layout instruction. The selected type of layout instruction is decoded to replace the selected type of layout instruction with a sequence of two or more instructions.

Another embodiment of the invention addresses an apparatus for decompressing a compressed value representing a sequence of instructions. A storage subsystem is configured for storing compressed instructions, wherein a compressed instruction comprises an X-index and a Y-index. A decompressor is configured for translating an X-index and Y-index accessed from the storage subsystem to a selected type of layout instruction. A decoder is configured for replacing the selected type of layout instruction with a sequence of two or more instructions.

A more complete understanding of the embodiments of the invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Perl, or in various other programming languages. A source program or source code written in one of these languages is compiled to a target processor architecture by converting the high level program code into a native assembler program using instructions encoded in a native instruction format. For example, a native instruction format for an instruction set architecture (ISA) may be a fixed number of bits, such as a 32-bit format or a 16-bit format, or may be a variable number of bits, such as a combination of a 32-bit format and a 16-bit format. Programs for the target processor architecture may also be written directly in a native assembler language. The native assembler program uses instruction mnemonic representations of machine level binary instructions. Program code or computer readable medium produced by a compiler or a human programmer as used herein refers to machine language code such as object code whose format is understandable by a processor.

Figure 1:
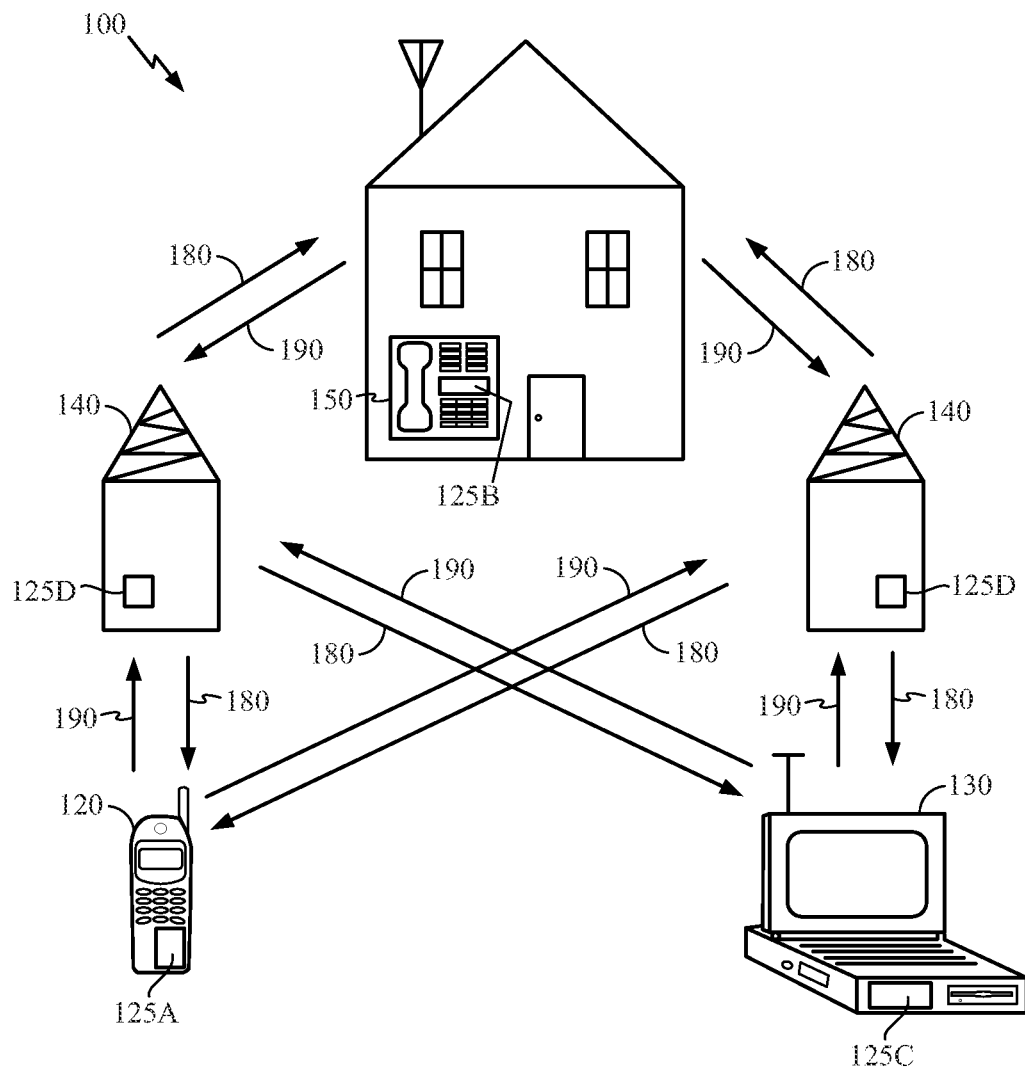
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system.

Figure 2:
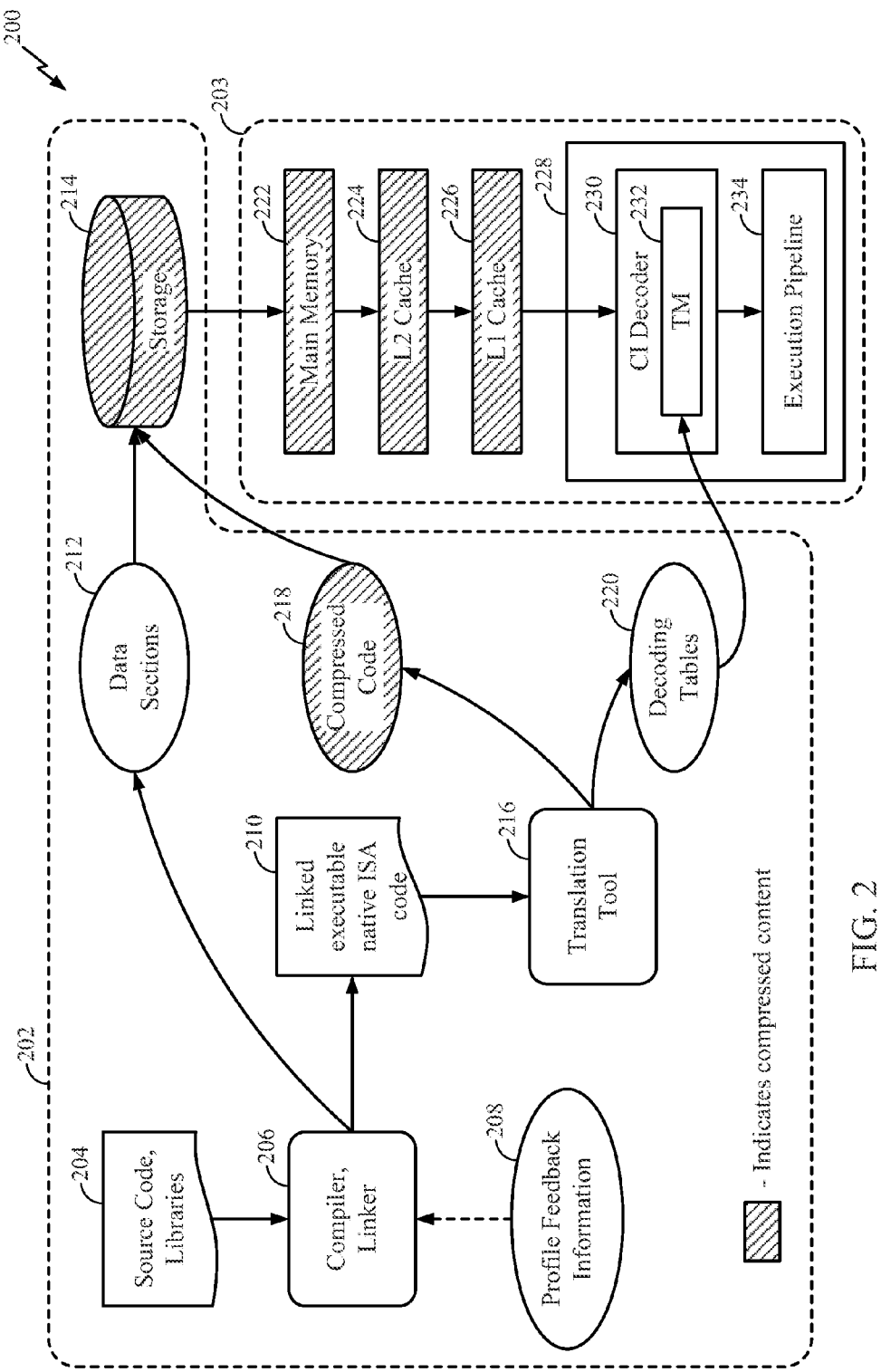
FIG. 2 is a system for code compression designed for efficient and low cost run time decompression in accordance with embodiments of the invention.

FIG. 2 is a compression system 200 for code compression designed for efficient and low cost run time decompression in accordance with embodiments of the invention. The compression system 200 includes source code as described above and binary library files in uncompressed form in source code and library files 204 which comprise the current program application being compiled. The compression system 200 also includes a compiler and linker 206 and optional profile feedback information 208, which are used to generate linked executable code 210 based on native instruction set architecture (ISA) formats and supporting data sections 212. The native ISA is represented by a fixed, uncompressed format and can represent a variety of approaches, including, for example, fixed 64- or 32- or 16-bit encodings and a mixture of such encodings. The native ISA is developed for general utility and not specifically tailored for a particular application. By maintaining fixed word boundaries, such as 32-bit instruction word boundaries, an addressing model that supports only fixed word addresses for branches, calls, returns, and the like may be used even though 16-bit and 32-bit instructions may be mixed together in the code.

Instructions selected from such an ISA may be compressed and tailored to the current application while maintaining addressability of the code and guaranteeing fast, fixed latency decompression time. Such compression may be automated to produce the compressed code in linear time. The native ISA has low informational entropy, which is increased in accordance with an embodiment of the invention by producing a custom entropy bounded encoding for the given source code and library files 204. Informational entropy in the present context is defined as a measure of informational content in a current representation of a program. The informational entropy may be viewed as a ratio of the current representation of the program using native instruction symbols and a shortest possible representation of the program using compressed symbols which preserves the original functionality of the program. The granularity of the alphabet used to create a compressed program is at an individual byte level, as an atomic storable and addressable entity in a computational system. The informational content that is preserved in both program representations is the original functionality of the program. For example, an entropy of "1" may represent one specific exact program in its shortest possible representation. A program having an entropy less than "1" indicates that more than one program may be supported and possibly a very large number of programs may be supported which requires an increased storage capacity in the memory.

In FIG. 2, the linked executable code 210 is provided as input to a translation tool 216 which generates compressed code 218 and decoding tables 220. The compressed code 218 and the supporting data sections 212 are stored in a storage device 214, such as a hard disk, optical disk, flash memory of an embedded device or other such storage medium from which selected code may be provided to a processor complex 203 for execution. The processor complex 203 includes a main memory 222, a level 2 cache (L2 cache) 224, a level 1 instruction cache (L1 cache) 226, and a processor core 228. The processor core 228 includes a decoder 230 having translation memory (TM) 232 in accordance with an embodiment and an execution pipeline 234. Compressed code is stored in the storage device 214, main memory 222, the L2 cache 224, and the L1 cache 226. Decompressed code is generally fetched from the L1 cache 226 and executed by the execution pipeline 234. Various embodiments of the translation tool 216 for generating the compressed code 218 and for decoding compressed instructions in decoder 230 are described in more detail below.

The processor complex 203 may be suitably employed in components 125A-125D of FIG. 1 for executing program code that is stored in compressed form in the L1 Icache 226, the L2 cache 224 and the main memory 222. Peripheral devices which may connect to the processor complex are not shown for clarity of discussion. The processor core 228 may be a general purpose processor, a digital signal processor (DSP), an application specific processor (ASP) or the like. The various components of the processing complex 203 may be implemented using application specific integrated circuit (ASIC) technology, field programmable gate array (FPGA) technology, or other programmable logic, discrete gate or transistor logic, or any other available technology suitable for an intended application. Though a single processor core 228 is shown, the processing of compressed instructions of an embodiment of the invention is applicable to superscalar designs and other architectures implementing parallel pipelines, such as multi-threaded, multi-core, and very long instruction word (VLIW) designs.

Figure 3:
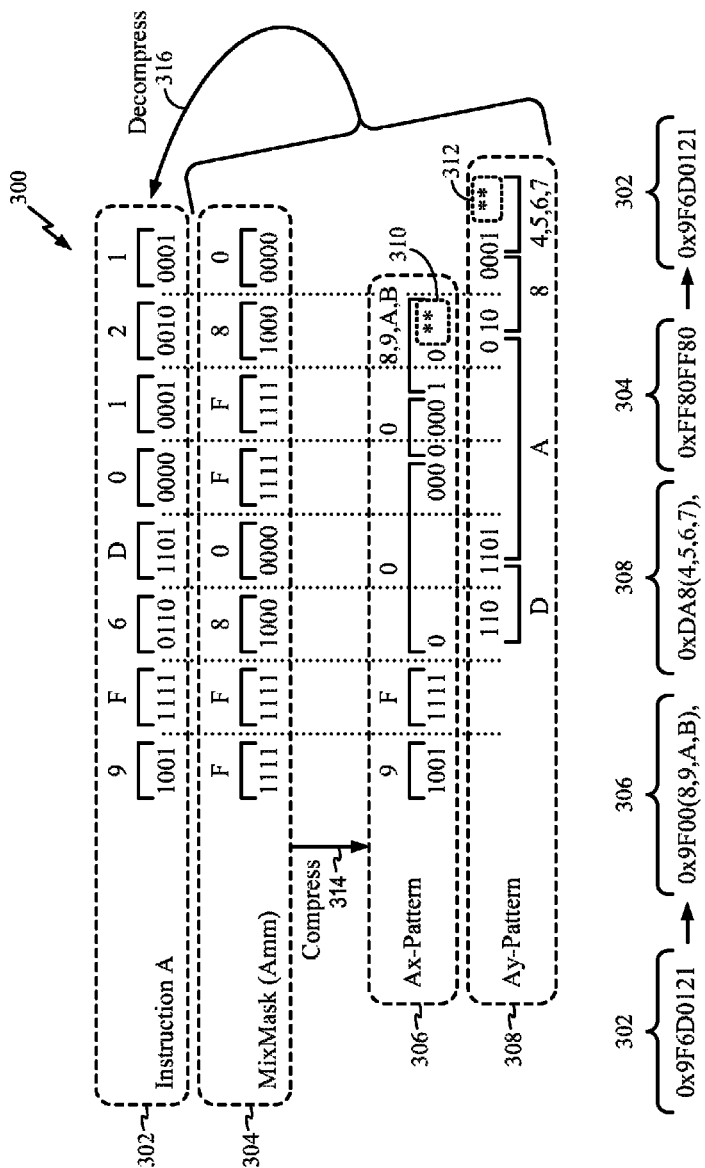
FIG. 3 illustrates exemplary elements of an instruction partition process that splits an instruction based on a mix mask into an X pattern and a Y pattern with byte overlap pad bits in accordance with an embodiment of the invention.

FIG. 3 illustrates exemplary elements 300 of an instruction partition process that splits a native ISA fixed size instruction A 302 based on a binary mix mask (MM) 304 into an Ax pattern 306 and an Ay pattern 308 with overlap pad bits 310 and 312 in accordance with an embodiment of the invention. Pad bits are produced due to requirements imposed by modern memory systems to represent instructions and data at least in byte granularity segments. The use of formats having byte granularity segments is utilized to provide a compacted representation allowing storage overlap on bit granularity while satisfying byte granularity requirements of the storage system.

To compress a native ISA code segment, the code segment is partitioned into groups of instructions, with each group contributing a single shared X pattern and a set of unique Y patterns. The Ax pattern 306 represents a bit pattern that is common to a group of instructions to which instruction A belongs. The Ay pattern 308 represents a bit pattern embodying the differences between the native instruction A 302 and the Ax pattern 306. Note, that a code segment can be partitioned into any number of groups between one and N, where N is the number of native instructions in the code segment. The X patterns for the code segment are stored in an X dictionary comprised of an X memory and the Ay patterns for the code segment are stored in a Y dictionary comprised of a Y memory. An X index is an address of a location in the X memory and a Y index is an address of a location in the Y memory. A combination of these two indexes, patterns from the X and the Y dictionaries, and the binary mix mask deterministically represents the native instruction.

A compress operation 314 uses at least one mix mask 304 for the code segment to select from a native instruction 302, an Ax pattern 306 and an Ay pattern 308. In the following examples, a hexadecimal number or hex number is represented with a '0x' prefix. For example, the native instruction 302 [0x9F6D0121] is combined with the mix mask 304 [0xFF80FF80] to produce the Ax pattern 306 [0x9F00(8,9, A,B)] and the Ay pattern 308 [0xDA8(4,5,6,7)]. The numbers in parentheses, for example (8,9,A,B) represent a set of possible numbers from which one number may be selected for a particular 4-bit position because of two "don't care" states of the overlap pad bits 310. A decoder 228 decompress operation 316 uses the at least one mix mask for the code segment, an X index fetched X memory pattern and a Y index fetched Y memory pattern to decompress the compressed instruction. For example, the mix mask 304 [0xFF80FF80] is combined with the Ax pattern 306, [0x9F00(8,9,A,B)] fetched from the X memory, and the Ay pattern 308, [0xDA8(4,5,6,7)] fetched from the Y memory, to produce the native instruction 302 [0x9F6D0121].

As described above, the X patterns and Y patterns are stored in a byte addressable X memory and a byte addressable Y memory, respectively. Index compression of X patterns, Y patterns, or both, makes use of a process that eliminates duplicate X patterns and duplicate Y patterns and overlaps pad bits, such as the overlap pad bits 310 and 312 in a byte addressable location, thus reducing double utilization of physical storage. With a single mix mask, all X patterns are of the same number of bits and all Y patterns are of the same number of bits. With different mix masks, it is possible to have a variety of different X and Y patterns for each native instruction. However, only a few combinations of mix masks generally provide mappings between the native ISA code segment and the compressed code segment taking the least storage relative to the number of mix mask combinations tested. A single mix mask which generates compressed code requiring low storage capacity is considered a near optimal mix mask.

Figure 4:
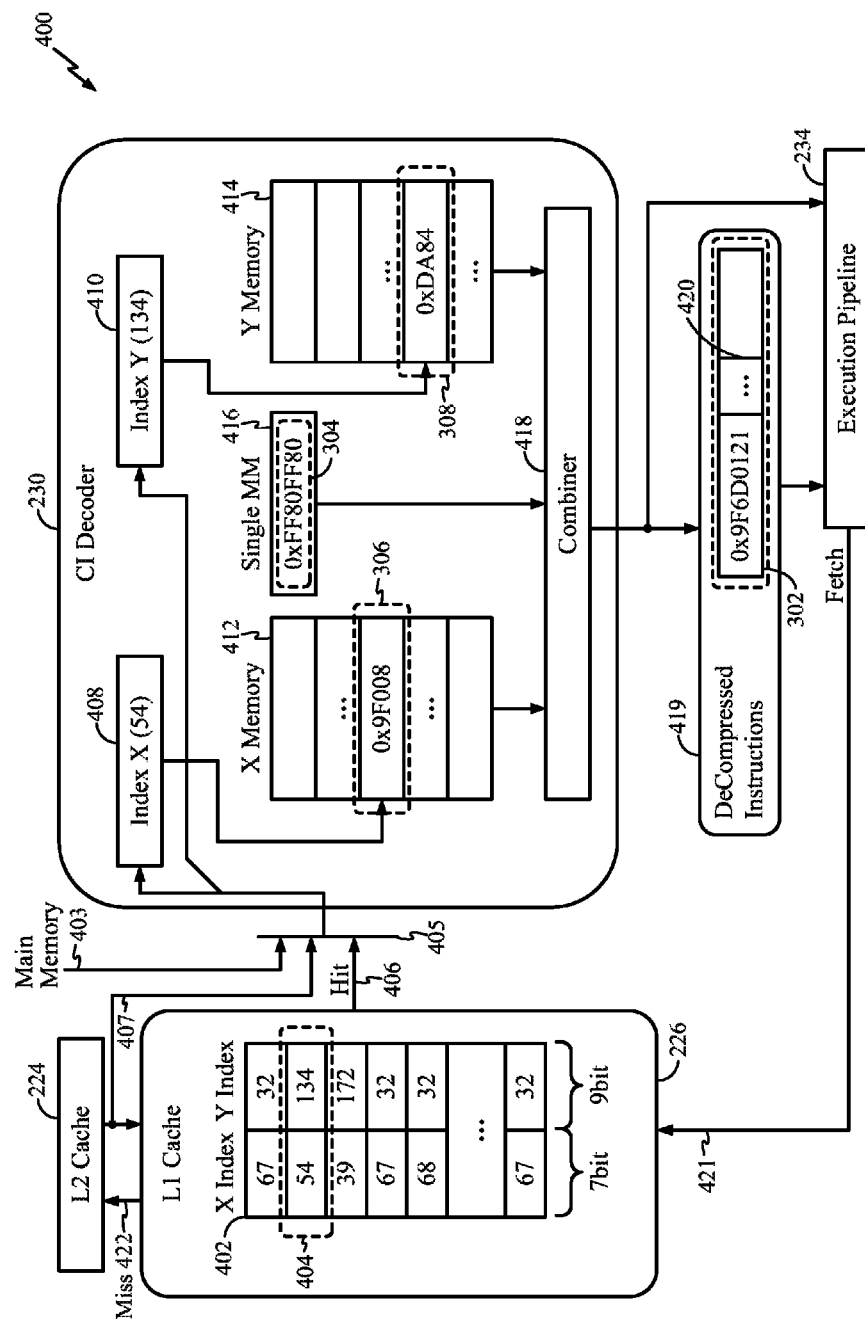
FIG. 4 is a decompressor and execution system wherein programs stored in compressed form in a level 2 cache and a level 1 cache are decompressed for execution in accordance with an embodiment of the invention.

FIG. 4 is a decompressor and execution system 400 wherein programs stored in compressed form in the L2 cache 224 and the L1 cache 226 are decompressed for execution in the execution pipeline 234 in accordance with an embodiment of the invention. The L1 cache 226 includes XY index memory 402 that stores an X index and a Y index pair in addressable locations, such as XY entry 404 having a 7-bit X index value of 0x54 and a 9-bit Y index value of 0x134. A multiplexer 405 is used to select an XY entry on an L1 cache hit 406 or an XY value 407 from L2 cache 224 on a miss in L1 cache 226. On miss in both L1 cache 226 and L2 cache 224, the multiplexor is used to select an XY entry from a main memory via a path 403. The decompression operation is accomplished in the decoder 230 having index X register 408, index Y register 410, X memory 412, Y memory 414, single mix mask (MM) register 416, and a combiner 418. Decompressed instruction storage 419 includes a plurality of uncompressed instructions 420 which may include a selected type of layout instruction as described in more detail below.

At program loading or in an embedded system boot process, main memory 222 is loaded with compressed code, X memory 412 and Y memory 414 are loaded with an associated X and Y dictionary context and the single binary mix mask is set in MM register 416. Note, that the X and Y memory context as well as mix mask can be reloaded during execution if needed. For example, reloading may permit the original code to be compressed into multiple segments, each with its own custom encoding. For instance, some complex embedded systems, such as smart phones, can invoke multiple independent child processes from a main application, which do not share code space and are self contained. Each such application can have its own custom encoding comprised of an X/Y dictionary and a MM, which is loaded at child process startup. For the remainder of the description, the decompressor system 400 is described using the decoder 230 having the single translation memory 232 of FIG. 2 and a single encoding is used for the whole system including any application code.

Next, the execution pipeline 234 begins fetching instructions from the L1 Icache 226. Initially, each access to the L1 Icache may generate a miss indication 422 causing an access to the L2 cache 224. Initially, the access to the L2 cache 224 may also generate a miss causing an access to main memory 222 of FIG. 2 which responds with a compressed instruction that is loaded in the L2 cache 224 and forwarded over path 403 to the decoder 230 through multiplexer 405. The decoder 230 decompresses the XY index compressed instruction to an uncompressed format for storage in the decompressed instruction storage 419 and for execution in the execution pipeline 234 as described with regard to the decompress operation 316 of FIG. 3. After a period of operation, the L1 Icache 226 and L2 cache 224 may reach a steady state.

From a processor perspective, the execution pipeline 234 attempts a fetch operation with a fetch address and control signals 421 for an instruction to be searched for in the L1 Icache 226. The L1 Icache 226 may determine that the instruction is present. The L1 cache fetch operation, for example, is for XY entry 404 which is a hit in the L1 cache 226, causing the XY entry 404 to be passed through multiplexer 405 to the decoder 230. The XY entry 404 is split with the X index value 0×54 received in the index X register 408 and the Y index value 0×134 received in the index Y register 410. The X pattern 306 fetched from the X memory 412 at address 0×54 is provided to the combiner 418. The Y pattern 308 fetched from the Y memory 414 at address 0×134 is also provided to the combiner 418. The single mix mask (MM) 304 [0xFF80FF80] stored in MM register 416 is further provided to the combiner 418. The combiner 418 combines the appropriate bits from the X pattern 306 with the appropriate bits from the Y pattern 308 according to the MM 304 to produce the native instruction 302 that is stored in the decompressed instruction storage 419 and passed to the execution pipeline 234.

In the described system, program content is stored in an implied encryption format. Even though no specific encryption type of data scrambling is performed on the instruction stream, program code is stored in the storage device 214, main memory 222, the L2 cache 224, and the L1 cache 226 in an application specific and compressed form. Since part of the encoded state of the program code resides inside the processor core 228 in the translation memory 232 which is not easily externally accessible in a final product, the storage 214 and upper memory hierarchy 222, 224, and 226 content is insufficient for restoring the original program, making it difficult to analyze or copy.

VLIW architectures present a number of challenges to instruction set architecture (ISA) designers. For example, each VLIW packet is comprised of multiple instructions, each generally bound to a specific execution unit and executed in parallel. Control transfer granularity is the whole VLIW packet by definition. There could not be a jump target in the middle of such a VLIW packet. In one approach, a VLIW packet may be stored in memory using a unique encoding for each instruction to deterministically identify each instruction in the packet. But since the instructions encoded within a VLIW are supposed to be executed in parallel, having fully encoded 32-bit instructions, for example, may be wasteful of storage space and slow to decode thus affecting performance. Indeed, decoding VLIW code may be a sequential task of parsing consecutive operations to determine VLIW packet boundaries.

The other extreme is to form a VLIW packet fully populated with instructions, including no-operation (NOP) instructions, where each instruction may be explicitly determined by its position in the packet. Thus, each packet would have an instruction slot position for each functional unit that may be operated in parallel. For example, a processor architecture having a parallel issue rate of six instructions would have a corresponding VLIW packet of six instructions. Such an approach in the current framework could be viewed as a fully uncompressed stateful representation of a VLIW packet. One possible gain of this approach is an expansion of bits in each instruction in the VLIW packet to increase each instruction's capabilities. However, this method is wasteful in its own way for storing no-ops, since forming VLIW packets containing all useful instructions without dependencies for parallel execution is difficult to achieve. An embodiment of the present invention introduces a different approach that utilizes a compression infrastructure to more optimally encode VLIW packets.

Figure 5:
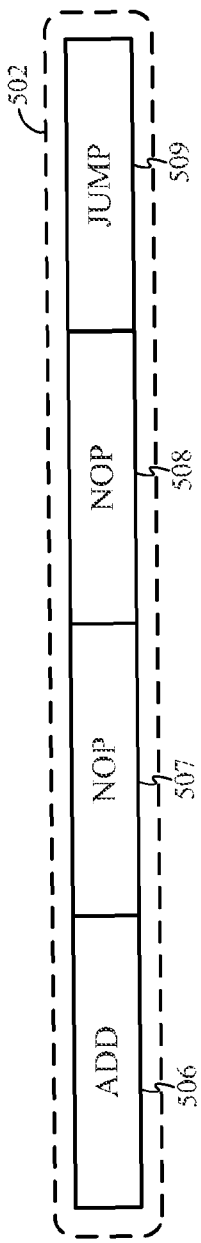
FIG. 5 illustrates exemplary very long instruction word (VLIW) packet formats comprising a first unpacked VLIW packet and a first compressed VLIW packet in accordance with an embodiment of the invention.
Figure 5:
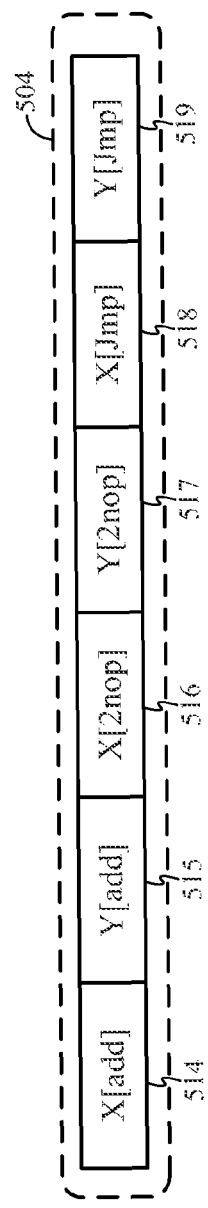

FIG. 5 illustrates exemplary very long instruction word (VLIW) packet formats 500 comprising a first uncompressed VLIW packet 502 and a first compressed VLIW packet 504 in accordance with an embodiment of the invention. The first uncompressed VLIW packet 502 comprises four 32-bit instruction set architecture (ISA) instructions, such as a 32-bit addition (ADD) instruction 506, a first 32-bit no-operation (NOP) instruction 507, a second 32-bit NOP instruction 508, and a 32-bit branch JUMP instruction 509. In an alternative embodiment utilizing a 16-bit ISA, four 16-bit instructions would be stored in an uncompressed VLIW 64-bit packet, for example. In FIG. 5, the two 32-bit NOP instructions 507 and 508 are a sequence of two NOPs that is identified by the translation tool 216 of FIG. 2 and compressed to an X[2nop] compressed field 516 and Y[2nop] compressed field 517 as shown in FIG. 3. The ADD instruction 506 and JUMP instruction 509 are each compressed to a corresponding X index and Y index pair compressed value, as also shown in FIG. 3. Thus, the first uncompressed VLIW packet 502 is compressed to form the first compressed VLIW packet 504.

The first compressed VLIW packet 504 comprises three sets of X and Y compressed fields representing the four instructions 506-509. The 32-bit ADD instruction 506 is represented by an eight bit X[add] compressed field 514 and an eight bit Y[add] compressed field 515. The sequence of the first NOP instruction 507 and second NOP instruction 508 are represented by the eight bit X[2nop] compressed field 516 and eight bit Y[2nop] compressed field 517. The X[2nop] compressed field 516 and Y[2nop] compressed field 517 represent an entropy encoded sequence of two NOP instructions that are expanded when decoded into the first NOP instruction 507 and the second NOP instruction 508. The JUMP instruction 509 is represented by an eight bit X[jmp] compressed field 518 and an eight bit Y[jmp] compressed field 519.

Figure 6:
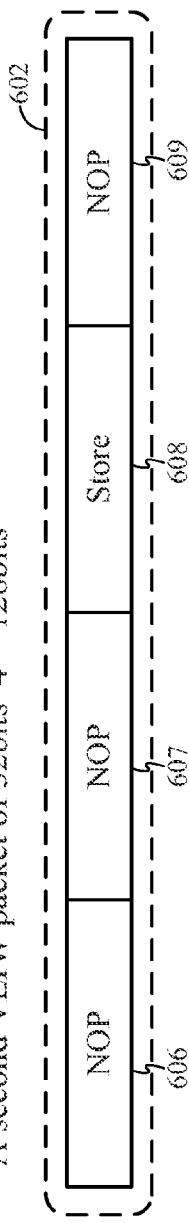
FIG. 6 illustrates exemplary VLIW packet formats comprising a second unpacked VLIW packet, a second VLIW compressed packet, and a third VLIW compressed packet in accordance with an embodiment of the invention.
Figure 6:
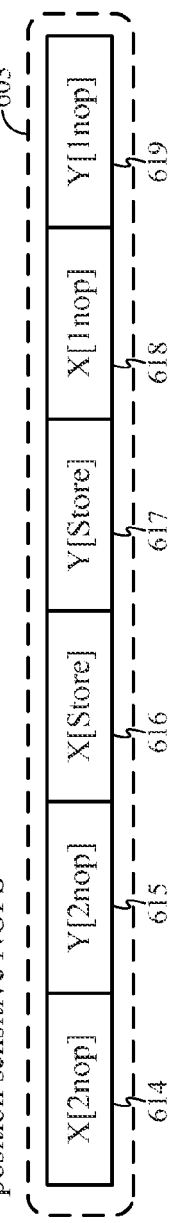
Figure 6:
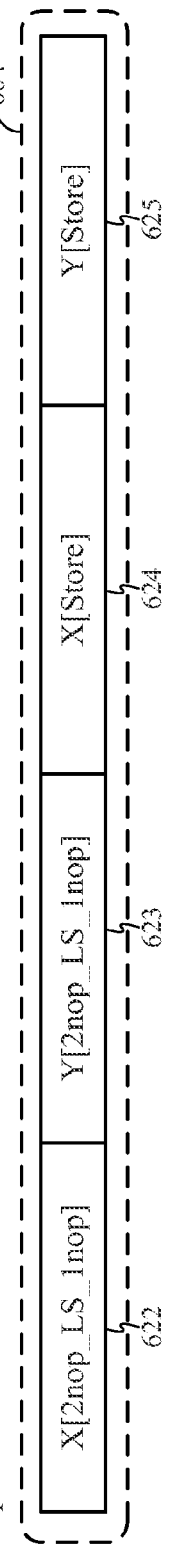

FIG. 6 illustrates exemplary VLIW packet formats 600 comprising a second uncompressed VLIW packet 602, a second VLIW compressed packet 603, and a third VLIW compressed packet 604 in accordance with an embodiment of the invention. The first uncompressed VLIW packet 602 comprises four 32-bit instructions, such as a first 32-bit no-operation (NOP) instruction 606, a second 32-bit NOP instruction 607, a 32-bit store instruction 608, and a third 32-bit NOP instruction 609.

The second compressed VLIW packet 603 comprises three X and Y compressed fields representing the four instructions 606-609. The sequence of the first NOP instruction 606 and second NOP instruction 607 is represented by an eight bit X[2nop] compressed field 614 and eight bit Y[2nop] compressed field 615. The X[2nop] compressed field 614 and Y[2nop] compressed field 615 represent an entropy encoded sequence of two ISA NOP instructions that are expanded when decoded into the first NOP instruction 606 and the second NOP instruction 607. The 32-bit store instruction 608 is represented by an eight bit X[store] compressed field 616 and an eight bit Y[store] compressed field 617. The third NOP instruction 609 is represented by an eight bit X[1nop] compressed field 618 and an eight bit Y[1nop] compressed field 619.

The second uncompressed VLIW packet 602 has a low utilization of useful bits having only one payload instruction 608 that is surrounded by two groups of NOPs, 606, 607, and 609. In order to provide a more compact representation of the second uncompressed VLIW packet 602 than that provided by the second compressed VLIW packet 603, a specialized NOP instruction is utilized per packet that encodes a layout of instructions within the VLIW packet. This specialized NOP instruction is termed a layout NOP. As the number of instructions in a VLIW packet increases to accommodate a larger number of functional units, it becomes increasingly advantageous to dedicate a single layout NOP in the VLIW packet rather than separately encoding each individual NOP instruction that may be included. For those VLIW packets without a NOP instruction, no storage space is wasted since a layout NOP is not needed. By placing a layout NOP instruction at the beginning or end of a VLIW packet, layout restoration becomes a task complexity of order O(1), as compared to a sequential task complexity of order O(n) for an "n" instruction VLIW packet.

The third VLIW compressed packet 604 comprises a set of two X and Y compressed fields representing the four instructions 606-609. The sequence of the first NOP instruction 606, second NOP instruction 607, store instruction 608 and third NOP instruction 609 is represented by a 2nop_LS_1nop instruction. The 2nop_LS_1nop instruction is an example of a new layout NOP instruction introduced to the current ISA. The 2nop_LS_1nop instruction identifies the number of NOP instructions and the placement of the NOP instructions in the combination of NOP instructions and the store instruction. The sequence of the two NOP instructions 606 and 607, store instruction 608, and third NOP instruction 609 is identified by the translation tool 216 of FIG. 2 and compressed to an X[2nop_LS_1nop] compressed field 622 and Y[2nop_LS_1nop] compressed field 623 as shown in FIG. 3. The Store instruction 608 is compressed to a single X index and Y index pair, also as shown in FIG. 3. Thus, the second uncompressed VLIW packet 602 is compressed to form the third VLIW compressed packet 604. For example, the X[2nop_LS_1nop] compressed field 622 and Y[2nop_LS_1nop] compressed field 623 represents an entropy encoded sequence of two ISA NOP instructions, a store instruction, and a third NOP instruction that are each expanded when decoded into the first NOP instruction 606 and the second NOP instruction 607, a placeholder for a store instruction, and a third NOP instruction 609. The 32-bit store instruction 608 is represented by an eight bit X[store] compressed field 624 and an eight bit Y[store] compressed field 625 filling in for the placeholder for the store instruction.

Figure 7:
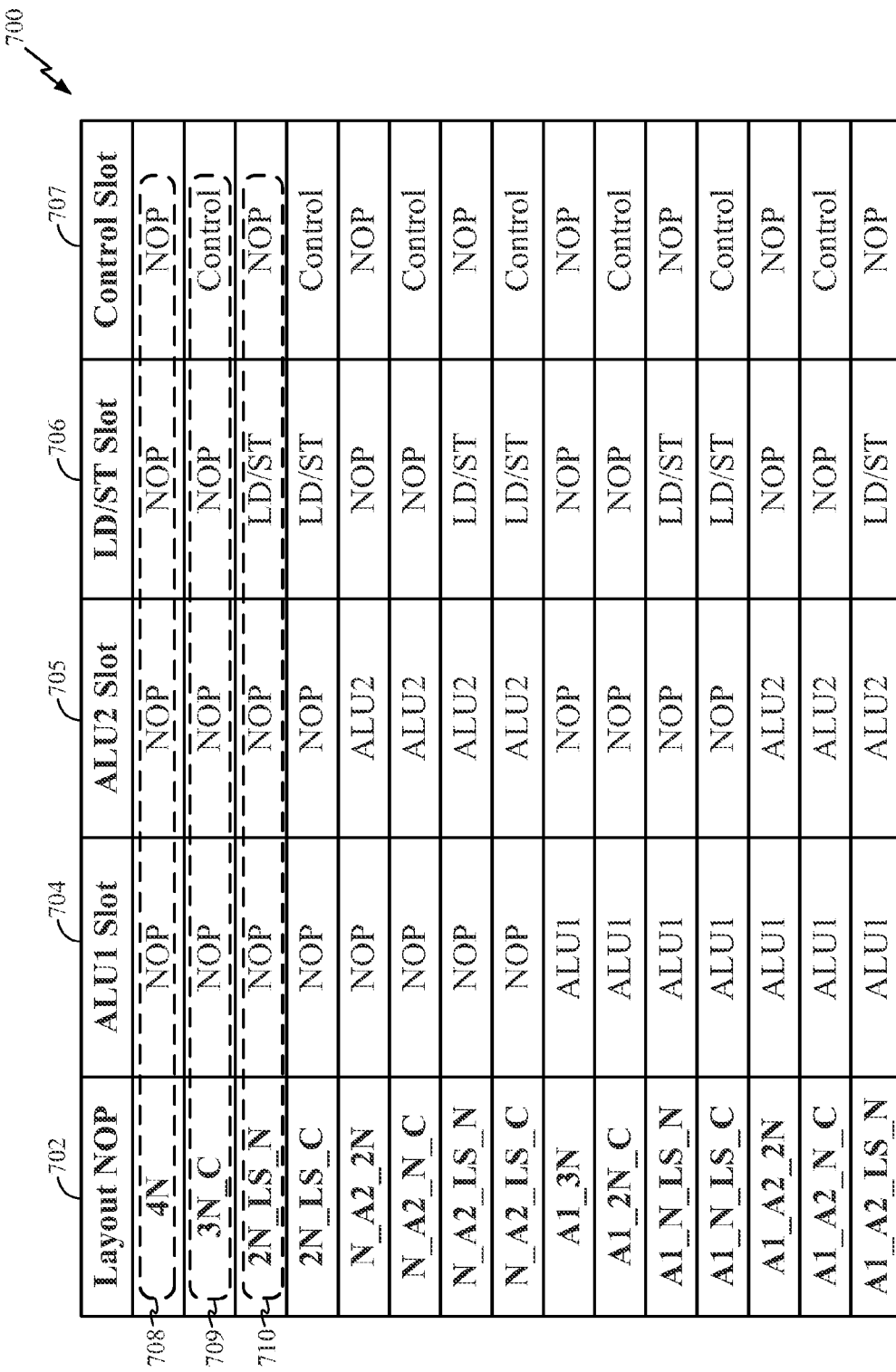
FIG. 7 illustrates an exemplary listing of no-operation (NOP) and function instruction combinations supporting a VLIW compressed packet in accordance with an embodiment of the invention.

FIG. 7 illustrates an exemplary listing 700 of no-operation (NOP) and function instruction combinations supporting a VLIW compressed packet in accordance with the present invention. A layout NOP column 702 contains layout NOP instruction entries encoded to represent a sequence of four instructions. For example, sequences of four instructions comprise combinations of NOP instructions (N), arithmetic logic unit instructions (A), load or store instructions (LS), and control instructions (C). The arithmetic logic unit 1 (ALU1) VLIW position column 704 contains entries encoded to represent an ALU1 instruction or a NOP instruction. The ALU2 VLIW position column 705 contains entries encoded to represent an ALU2 instruction or a NOP instruction. The load or store VLIW position column 706 contains entries encoded to represent a load or a store (LD/ST) instruction or a NOP instruction. The control VLIW position column 707 contains entries encoded to represent a control instruction or a NOP instruction. For example, the line entry 708 is a layout NOP instruction representing four NOP instructions (4N) and having a NOP instruction in each slot column 704-707. In another example, the line entry 709 is a layout NOP instruction representing three NOP instructions (3N) and a control instruction (C) and having a NOP instruction in each slot column 704-706 and a control instruction in slot column 707. In a further example, the line entry 710 is a layout NOP instruction representing two NOP instructions (2N) in each slot column 704 and 705, a load or store instruction (LD/ST) in slot column 706, and another NOP instruction (N) in slot column 707. The 2N_LS_N layout NOP instruction of line entry 710 may correspond to the third VLIW compressed packet 604 of FIG. 6. Also, note that the layout NOP instructions of column 702 in FIG. 7 are application independent, and generally depend on the underlying VLIW architecture.

The approach of using a layout NOP instruction may be extended to introduce new custom instructions tailored for a specific application, but decodable to the existing ISA space. For example, if during a program evaluation process, one or more specific VLIW packets are determined to appear in the instruction stream with high frequency, each different VLIW packet may be encoded as a single specialized layout instruction. Such a sequence of frequently used instructions in a VLIW packet is identified by the translation tool 216 of FIG. 2 and compressed to single X compressed field and single Y compressed field as shown in FIG. 3. Thus, multiple specialized layout instructions may be included in an ISA using an unused encoding of the ISA for decode purposes and for compressing a sequence of frequently used instructions as described in more detail below. Note that, unlike layout NOP instructions, the multiple specialized layout instructions are application dependent.

Figure 8:
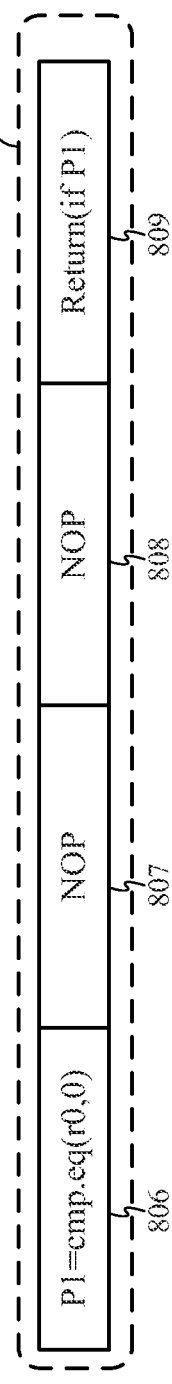
FIG. 8 illustrates exemplary VLIW packet formats comprising a third uncompressed VLIW packet, comprising frequently used pairs of instructions and a fourth VLIW compressed packet in accordance with an embodiment of the invention.
Figure 8:
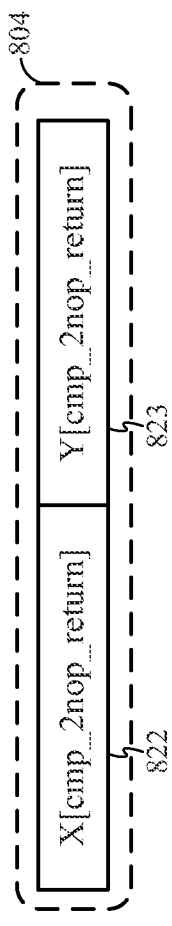

FIG. 8 illustrates exemplary VLIW packet formats 800 comprising a third uncompressed VLIW packet 802 including frequently used pairs of instructions and a compressed specialized layout instruction 804 in accordance with an embodiment of the invention. The third uncompressed VLIW packet 802 comprises four 32-bit instructions, such as a compare equal (P1=cmp.eq(r0,0)) instruction 806, a first no-operation (NOP) instruction 807, a second NOP instruction 808, and a branch Return instruction 809. The compare equal instruction 806 and the return instruction 809 comprise a frequently used pair of instructions. Frequency of use may be determined from an analysis of programs running on the processor complex 203 of FIG. 2. Such frequency of use analysis may be determined dynamically in a simulation environment or statically in the compiler and linker 206 of FIG. 2, for example.

The third uncompressed VLIW packet 802 may be represented by a cmp_2nop_return instruction which is an example of a specialized layout instruction introduced to the current ISA. The cmp_2nop_return instruction is identified by the translation tool 216 of FIG. 2 and compressed to an X[cmp_2nop_return] compressed field 822 and Y[cmp_2nop_return] compressed field 823 as shown in FIG. 3. Thus, the third uncompressed VLIW packet 802 is compressed to form the compressed specialized layout instruction 804.

The compressed specialized layout instruction 804 comprises two X and Y compressed fields representing the four instructions 806-809. The frequently used sequence of the compare equal instruction 806 and the return instruction 809 is represented by an eight bit X[cmp_2nop_return] compressed field 822 and an eight bit Y[cmp_2nop_return] compressed field 823. The X[cmp_2nop_return] compressed field 822 and the Y[cmp_2nop_return] compressed field 823 represents an entropy encoded sequence of the two frequently used ISA instructions that are expanded when decoded into the compare equal instruction 806, the two NOP instructions 807 and 808, and the branch Return instruction 809.

Figure 9A:
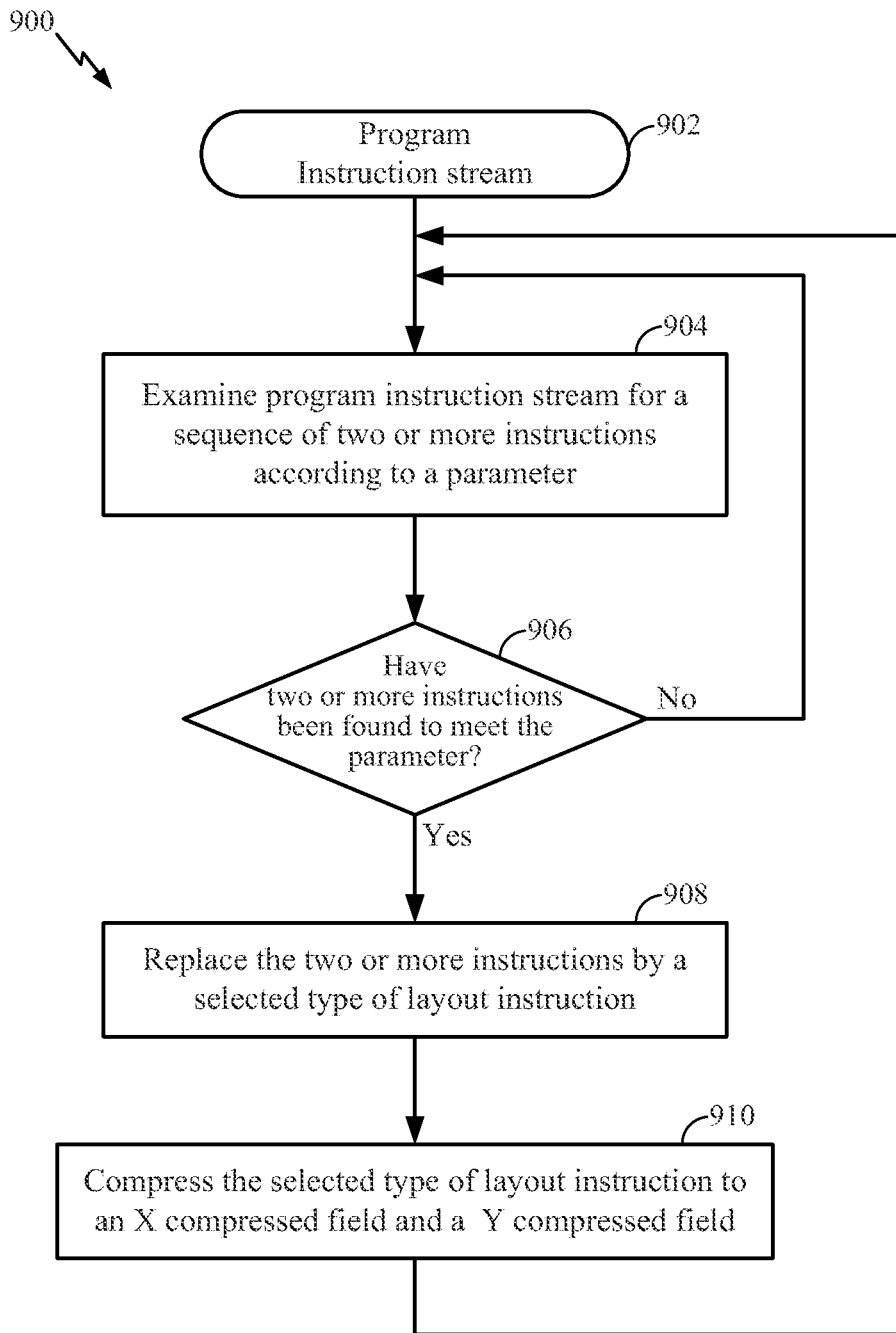
FIG. 9A illustrates a process for compacting a sequence of program instructions in accordance with an embodiment of the invention.

FIG. 9A illustrates a process 900 for compacting a sequence of program instructions in accordance with an embodiment of the present invention. At block 902, instructions from a program instruction stream are received. At block 904, the program instruction stream is examined for a sequence of two or more instructions according to a parameter. An exemplary parameter for a sequence of two 32-bit instructions may be a 64-bit pattern comprising the sequence of two instructions. In another embodiment, a parameter for a sequence of two instructions may be a sequence of two assembler instruction mnemonics, each representing an instruction in an ISA. Such a sequence of frequently used instructions in a VLIW packet may be identified by a compiler, such as compiler 206 of FIG. 2, or a translation tool, such as the translation tool 216 of FIG. 2. As instructions are received from the program instruction stream, two instructions at a time may then be compared to the parameter to indicate whether the sequence of two instructions has been found. For example, a first parameter may indicate a sequence of two NOP instructions. A second parameter may indicate a sequence of three NOP instructions. The parameter may also indicate an entry in a list of specific instruction sequences, such as the exemplary listing 700 of NOP and function instruction combinations. Further examples of parameters may be determined on an application basis, such as parameters set to indicate frequently used sequences of instructions, as described with regard to FIG. 8.

At decision block 906, a determination is made whether a current sequence of two or more instructions have been found to meet the parameter. If the current sequence of two or more instructions does not meet the parameter, the process 900 returns to block 904. If the current sequence of two or more instructions does meet the parameter, the process 900 proceeds to block 908. At block 908, the sequence of two or more instructions is replaced by a selected type of layout instruction associated with the parameter. At block 910, the selected type of layout instruction is compressed to an X compressed field and a Y compressed field. The process 900 then returns to block 904.

Figure 9B:
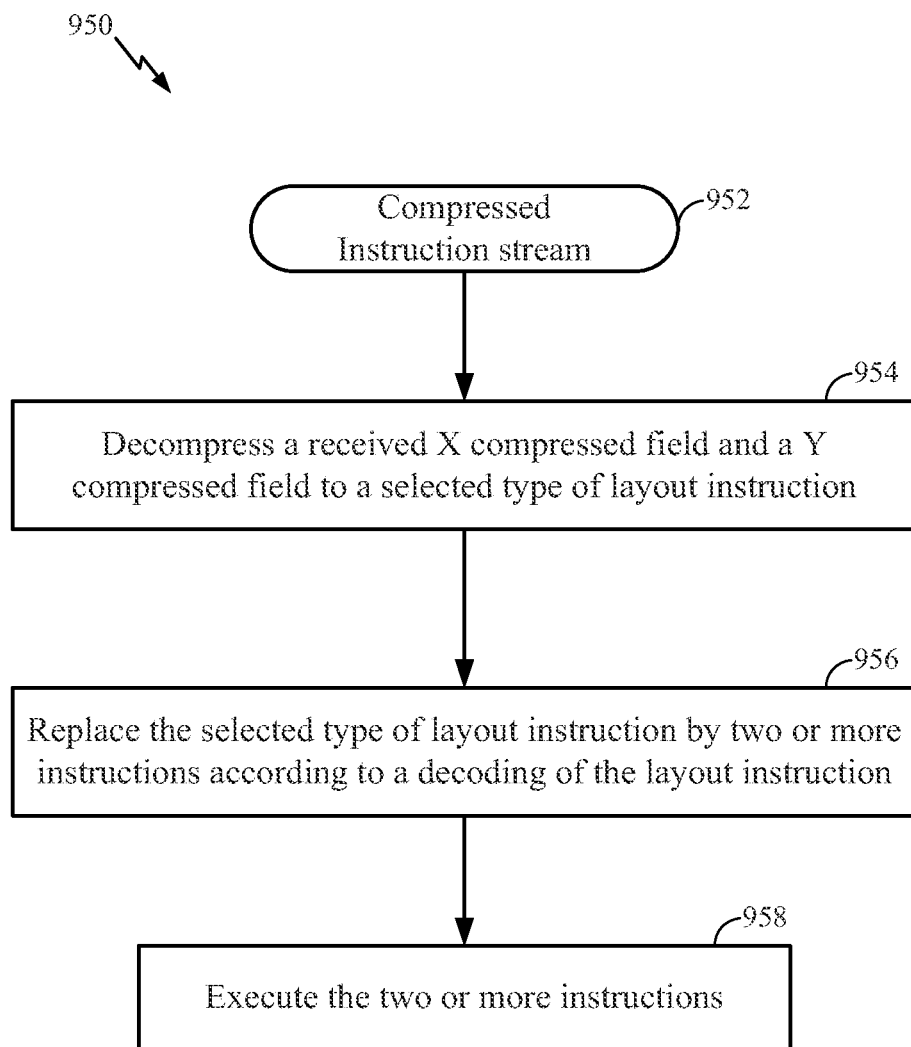
FIG. 9B illustrates a process for decoding a compressed value representing a sequence of program instructions in accordance with an embodiment of the invention.

FIG. 9B illustrates a process 950 for decoding a compressed value representing a sequence of program instructions in accordance with an embodiment of the invention. At block 952, compressed instructions from a compressed instruction stream are received. At block 954, a received X compressed field and Y compressed field are decompressed, for example to a selected type of layout instruction. The process 950 is repeated to decompress each received compressed instruction. At block 956, the exemplary selected type of layout instruction is replaced by two or more instructions according to a decoding of the layout instruction. At block 958, the two or more instructions are executed which completes the process 950 for the two or more instructions received at block 958.

Figure 10:
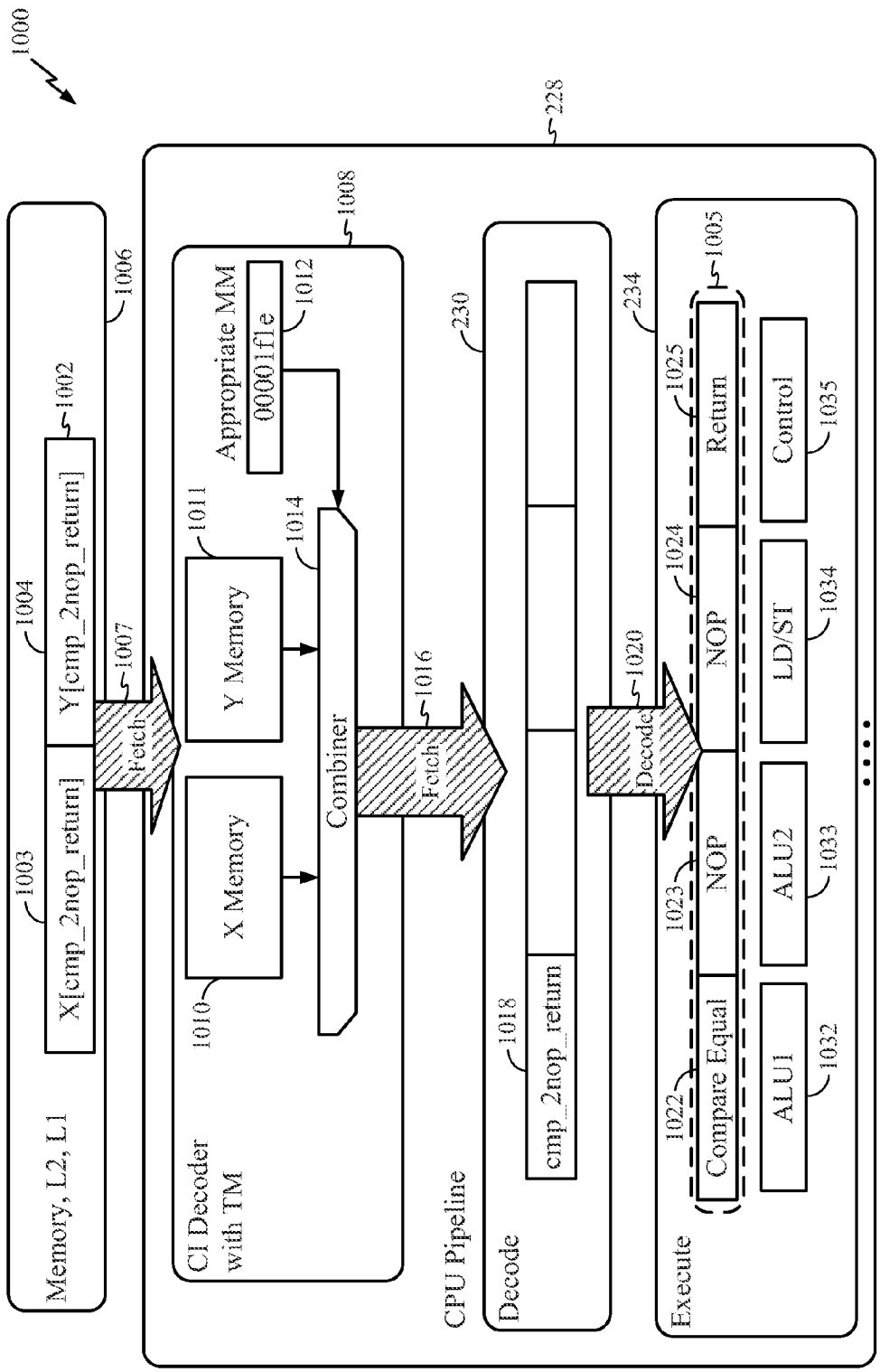
FIG. 10 illustrates an exemplary decompression state diagram in accordance with an embodiment of the invention.

FIG. 10 illustrates an exemplary decompression state diagram 1000 in accordance with an embodiment of the invention. The decompression state diagram 1000 illustrates states that a compressed specialized layout instruction 1002, such as the compressed specialized layout instruction 804, enters to determine decompressed instructions 1005 for execution on a processor pipeline. FIG. 10 shows the compressed specialized layout instruction 1002 in the memory hierarchy 1006 comprising, for example, main memory 222, an L2 cache 224, and an L1 cache 226. The processor core 228 comprises a compressed instruction decoder 1008 and execution pipeline 234. A fetch operation 1007 retrieves the compressed specialized layout instruction 1002 from the memory hierarchy 1006 to the compressed instruction decoder 1008. The compressed instruction decoder 1008 is configured to use the X[cmp_2nop_return] 1003 as an X index to access the X memory 1010 for an X bit pattern and the Y[cmp_2nop_return] 1004 as a Y index to access the Y memory 1011 for a Y bit pattern. An appropriate mix mask (MM) 1012 is applied in a combiner 1014 which is configured to combine the X bit pattern with the Y bit pattern according to the MM 1012 and provide a translated value during a fetch operation 1016 to the processor core 228. For example, the translated value may be a 32 bit cmp_2nop_return instruction 1018. A decoder 230 is operable to decode the 32 bit cmp_2nop_return instruction 1018 in a decode operation 1020 and provide the decoded output as an uncompressed VLIW packet 1005 to the execution pipeline 234. The uncompressed VLIW packet 1005 comprises a compare equal instruction 1022, a first NOP instruction 1023, a second NOP instruction 1024, and a return instruction 1025. The two NOP instructions 1023 and 1024 are inserted as part of the decode operation 1020 thereby not requiring storage area for these two instructions in the memory hierarchy 1006. An ALU1 execution unit 1032, an ALU2 execution unit 1033, a load/store (LD/ST) execution unit 1034, and a control execution unit 1035 are each configurable to execute the corresponding instructions 1022-1025.

The methods described in connection with the embodiments disclosed herein may be embodied in a combination of hardware and software, the software being a program or sequence of computer-readable instructions stored in a non-transitory computer-readable storage medium and executable by a processor. The program or sequence of computer-readable instructions may reside in random access memory (RAM), flash memory, read only memory (ROM), electrically programmable read only memory (EPROM), hard disk, a removable disk, tape, compact disk read only memory (CD-ROM), or any other form of storage medium known in the art or to be advised in the future. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using downloading techniques.

While the invention is disclosed in the context of illustrative embodiments for use in processors it will be recognized that a wide variety of implementations may be employed by persons of ordinary skill in the art consistent with the above discussion and the claims which follow below. For example, in an alternative embodiment, the decoder 230 of FIG. 2 may be placed after a level 2 (L2) cache in a system where the main memory and L2 cache store compressed instructions and a level 1 (L1) cache stores uncompressed instructions. In such a system the main memory and L2 cache would also store compressed sequences of two or more instructions.

What is claimed is:

1. A method of compressing a sequence of program instructions, the method comprising:
   identifying a sequence of instructions that includes a no operation (NOP) instruction and two function instructions, wherein each instruction of the sequence of instructions has a same number of bits;
   replacing the identified sequence of instructions by a selected type of layout instruction comprised with the same number of bits as one of the two function instructions, wherein the selected type of layout instruction identifies a position of each instruction in the identified sequence of instructions; and
   compressing the selected type of layout instruction to an X-index and a Y-index pair of compressed values.

2. The method of claim 1, wherein the identified sequence of instructions includes a sequence of two or more NOP instructions.

3. The method of claim 2, wherein the sequence of two or more NOP instructions is positioned between the two function instructions.

4. The method of claim 1, wherein the identified sequence of instructions includes a second NOP instruction.

5. The method of claim 1, wherein each function instruction of the two function instructions comprises an arithmetic logic unit instruction, a load instruction, a store instruction, or a control instruction.

6. The method of claim 1, wherein the two function instructions correspond to a pair of function instructions that has been identified in an instruction stream at least a particular number of times.

7. The method of claim 1, wherein the identified sequence of instructions includes at least four instructions.

8. The method of claim 1, wherein the identified sequence of instructions is a very long instruction word packet of three or more instructions.

9. The method of claim 1, wherein the identified sequence of instructions includes two non-contiguous NOP instructions that include the NOP instruction.

10. The method of claim 1, wherein the identified sequence of instructions includes a sequence of three NOP instructions.

11. A method to decompress instructions, the method comprising:
    accessing an X-index and a Y-index together as a compressed value;
    decompressing the compressed value to a selected type of layout instruction comprising a defined number of bits, wherein the selected type of layout instruction identifies instructions in a packet of instructions that includes a plurality of no operation (NOP) instructions and one or more function instructions positioned between a pair of NOP instructions of the plurality of NOP instructions in the packet of instructions, wherein the selected type of layout instruction further identifies a number of occurrences of the plurality of NOP instructions and placement of each NOP instruction of the plurality of NOP instructions to an identified position in the packet of instructions; and
    decoding the selected type of layout instruction to replace the selected type of layout instruction with the packet of instructions, wherein each identified instruction of the packet of instructions is comprised with a same defined number of bits.

12. The method of claim 11, wherein the decompressing comprises:
    selecting an X pattern from an X pattern memory according to the X-index;
    selecting a Y pattern from a Y pattern memory according to the Y-index; and
    combining the X pattern with the Y pattern according to a mix mask to create the selected type of layout instruction.

13. The method of claim 11, wherein the selected type of layout instruction indicates three or more NOP instructions.

14. The method of claim 11, wherein the selected type of layout instruction indicates the packet of instructions is a combination of three or more NOP instructions and the one or more function instructions.

15. The method of claim 11, wherein the one or more function instructions include a pair of function instructions that has been identified in an instruction stream at least a particular number of times.

16. The method of claim 11 wherein the decompressing is accomplished on an instruction fetch from a memory hierarchy of a processor core.

17. An apparatus for decompressing a compressed value representing a sequence of instructions, the apparatus comprising:
    a storage subsystem configured for storing compressed instructions, wherein a compressed instruction comprises an X-index and a Y-index;
    a decompressor configured for translating the X-index and the Y-index to a selected type of layout instruction comprising a defined number of bits, wherein the selected type of layout instruction identifies instructions in a packet of instructions that includes a plurality of no operation (NOP) instructions and one or more function instructions positioned between a pair of NOP instructions of the plurality of NOP instructions in the packet of instructions, wherein the selected type of layout instruction further identifies a number of occurrences of the plurality of NOP instructions and placement of each NOP instruction of the plurality of NOP instructions to an identified position in the packet of instructions; and
    a decoder configured for replacing the selected type of layout instruction with the packet of instructions, wherein each identified instruction of the packet of instructions is comprised with a same defined number of bits.

18. The apparatus of claim 17, wherein the decompressor comprises:
    an X pattern memory operable to store X patterns that are selected according to the X-index;
    a Y pattern memory operable to store Y patterns that are selected according to the Y-index; and
    a combiner configured for combining a selected X pattern with a selected Y pattern according to a mix mask to create the selected type of layout instruction.

19. The apparatus of claim 17, wherein the plurality of NOP instructions includes three NOP instructions.

20. The apparatus of claim 17, wherein the instructions in the packet of instructions include a combination of three NOP instructions and the one or more function instructions.

21. The apparatus of claim 17, wherein the one or more function instructions include a pair of function instructions that has been identified in an instruction stream at least a particular number of times.

22. The apparatus of claim 17, wherein the storage subsystem comprises:
   a level 1 instruction cache operable to store the compressed instructions.

23. A method of compressing a sequence of program instructions, the method comprising:
   identifying a sequence of K instructions that includes one or more no operation (NOP) instructions and two or more function instructions, wherein each instruction of the sequence of K instructions has a same number of bits B, and K is a positive integer $\geq 3$;
   replacing the identified sequence of K instructions by a selected type of layout instruction comprised with the same number of bits B, wherein the selected type of layout instruction encodes the sequence of K instructions, and wherein the selected type of layout instruction identifies a position of each instruction in the identified sequence of K instructions; and
   compressing the selected type of layout instruction to an X-index and a Y-index pair of compressed values that is a compressed representation of the identified sequence of K instructions.

24. The method of claim 23, wherein the selected type of layout instruction solely represents the sequence of K instructions.

25. An apparatus for decompressing a compressed value representing a sequence of instructions, the apparatus comprising:
   means for storing compressed instructions, wherein a compressed instruction comprises an X-index and a Y-index;
   means for translating the X-index and the Y-index to a selected type of layout instruction comprising a defined number of bits, wherein the selected type of layout instruction identifies instructions in a packet of instructions that includes a plurality of no operation (NOP) instructions and one or more function instructions positioned between a pair of NOP instructions of the plurality of NOP instructions in the packet of instructions, wherein the selected type of layout instruction further identifies a number of occurrences of the plurality of NOP instructions and placement of each NOP instruction of the plurality of NOP instructions to an identified position in the packet of instructions; and
   means for replacing the selected type of layout instruction with the packet of the instructions, wherein each identified instruction of the packet of instructions is comprised with a same defined number of bits.

26. A computer readable non-transitory medium encoded with computer readable program data and code which, when executed by a processor, causes the processor to perform operations comprising:
   identifying a sequence of instructions that includes a no operation (NOP) instruction and two function instructions, wherein each instruction of the sequence of instructions has a same number of bits;
   replacing the identified sequence of instructions by a selected type of layout instruction comprised with the same number of bits as one of the two function instructions, wherein the selected type of layout instruction identifies a position of each instruction in the identified sequence of instructions; and
   compressing the selected type of layout instruction to an X-index and a Y-index pair of compressed values.

* * * * *